United States Patent
Liu et al.

(10) Patent No.: US 7,495,913 B1
(45) Date of Patent: Feb. 24, 2009

(54) HEAT DISSIPATING ASSEMBLY HAVING A FAN DUCT

(75) Inventors: Peng Liu, Shenzhen (CN); Jun Cao, Shenzhen (CN); Shi-Wen Zhou, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/836,718

(22) Filed: Aug. 9, 2007

(51) Int. Cl.
*H05K 7/20* (2006.01)
*F28F 7/00* (2006.01)

(52) U.S. Cl. .............. 361/697; 165/80.3; 165/121; 361/695

(58) Field of Classification Search ......... 165/121–122; 361/697, 700, 703, 695
See application file for complete search history.

(56) References Cited

U.S. PATENT DOCUMENTS

| | | | | |
|---|---|---|---|---|
| 6,021,042 A | * | 2/2000 | Anderson et al. | 361/695 |
| 6,155,920 A | * | 12/2000 | Pan et al. | 454/184 |
| 6,163,453 A | * | 12/2000 | Hou et al. | 361/687 |
| 6,256,197 B1 | * | 7/2001 | Galis | 361/687 |
| 6,304,445 B1 | | 10/2001 | Bollesen | |
| 6,370,023 B1 | * | 4/2002 | Su | 361/687 |
| 6,400,568 B1 | * | 6/2002 | Kim et al. | 361/697 |
| 6,496,368 B2 | * | 12/2002 | Jui-Yuan | 361/697 |
| 7,042,722 B2 | * | 5/2006 | Suzuki et al. | 361/695 |
| 7,113,403 B2 | * | 9/2006 | Kuo et al. | 361/697 |
| 7,261,516 B2 | * | 8/2007 | Liang et al. | 415/213.1 |
| 7,304,845 B2 | * | 12/2007 | Xia et al. | 361/697 |
| 2005/0280990 A1 | * | 12/2005 | Goodenough et al. | 361/695 |
| 2008/0101018 A1 | * | 5/2008 | Long et al. | 361/695 |

* cited by examiner

*Primary Examiner*—Gregory D Thompson

(57) ABSTRACT

A heat dissipating assembly for dissipating heat from a CPU and a VRM simultaneously includes a base (10) contacting the CPU, a heat sink (20) mounted on the base, a pair of fans (30) attached on a front side of the heat sink, and a fan duct (40) secured to the fans. The fan duct has a first inlet (440) through which a part of airflow flows into the fan duct, a second inlet (460) through which another part of the airflow flowing into the fan duct. The another part of the airflow also flows through the VRM so it can cool the VRM. The fan duct further has an outlet (480) for allowing the airflow generated by the fans to blow to the heat sink.

16 Claims, 4 Drawing Sheets

HEAT DISSIPATING ASSEMBLY HAVING A FAN DUCT

BACKGROUND OF THE INVENTION

1. Field of the Invention

The present invention relates to a heat dissipating assembly, and more particularly to a heat dissipating assembly incorporating a fan duct for guiding airflow generated by fans to cool at least two different electronic components.

2. Description of Related Art

The central processing unit (CPU) mounted on the motherboard in a computer is the center of operations of the computer. During the operation of the computer, the CPU produces heat. The heat must be quickly carried away from the CPU during the operation of the computer. Excessively high temperature causes the CPU to work abnormally. In addition to the CPU, a voltage regulator module (VRM) near to the CPU is also a source of heat that needs to be cooled.

Typically, a related heat sink having a fan duct is mounted on the CPU to remove heat therefrom. A fan is often mounted on the fan duct to provide forced airflow to the heat sink. One example of the related art is disclosed in U.S. Pat. No. 6,304,445 B1. However, the related heat sink mounted in the computer can only dissipate heat generated by the CPU, and cannot dissipate the heat generated by other heat-generating electronic components, such as a VRM next to the CPU because the airflow generated by the fan is not guided to flow through the other heat-generating electronic components.

What is needed, therefore, is a heat dissipating assembly which can overcome the above-mentioned disadvantage.

SUMMARY OF THE INVENTION

A heat dissipating assembly is disclosed for dissipating heat from a CPU and a VRM simultaneously; the heat dissipating assembly includes a base contacting the CPU, a heat sink mounted on the base, a pair of fans attached on a front side of the heat sink, and a fan duct secured to the fans. The fan duct includes a first inlet through which a part of airflow flows into the fan duct, a second inlet through which another part of the airflow flows into the fan duct. The airflow in the fan duct flows to the heat sink via an outlet of the fan duct, thereby to dissipate heat absorbed by the heat sink from the CPU. The another part of the airflow flows through the VRM when it is drawn into the fan duct via the second inlet, whereby heat generated by the VRM is dissipated.

Other advantages and novel features of the present invention will become more apparent from the following detailed description when taken in conjunction with the accompanying drawings, in which:

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Figure 1:
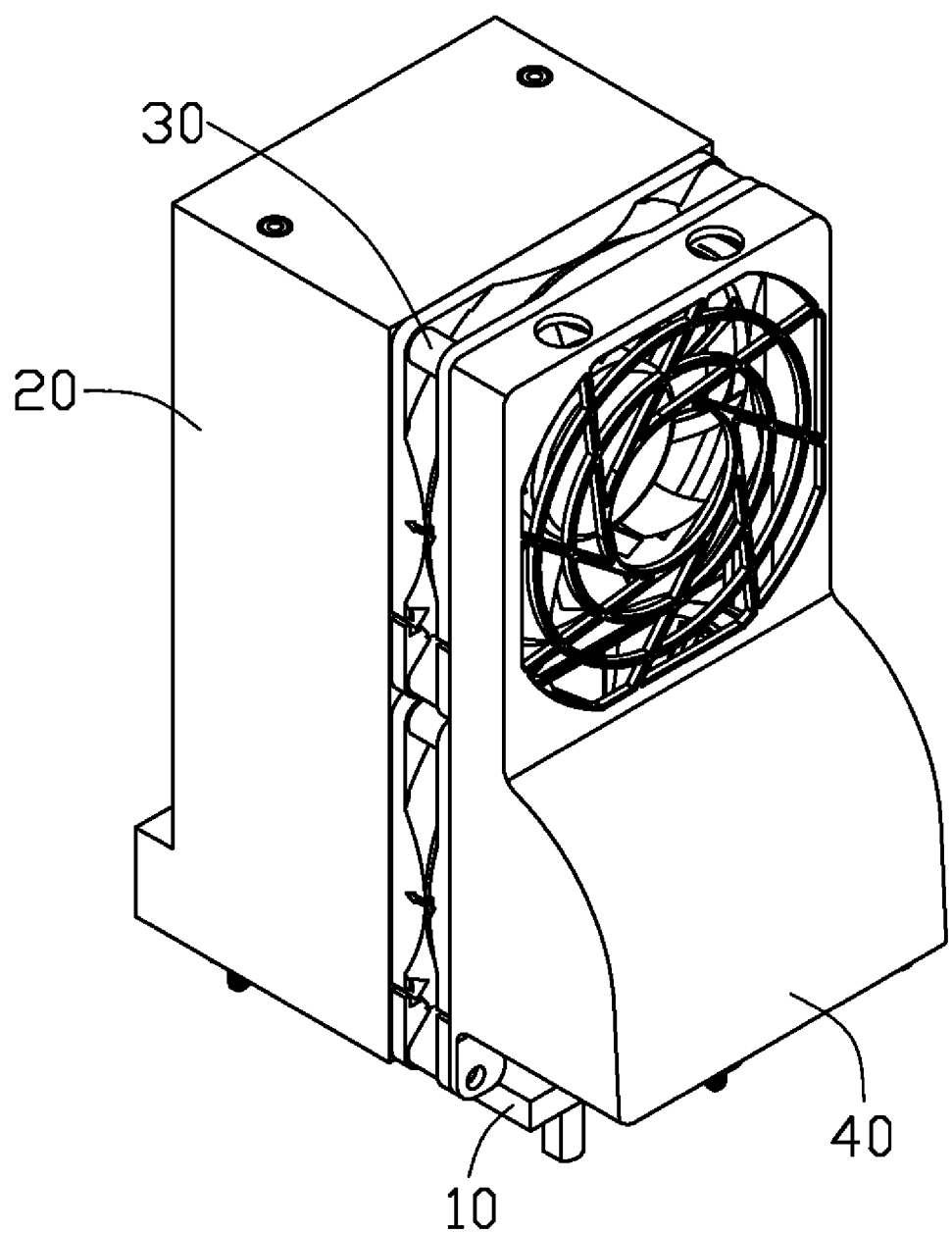
FIG. 1 is an assembled, isometric view of a heat dissipating assembly in accordance with a preferred embodiment of the present invention.

Referring to FIG. 1, a heat dissipating assembly in accordance with a preferred embodiment of the present invention comprises a base 10 for absorbing heat generated by a CPU (not shown), a heat sink 20 contacting the base 10, a pair of fans 30 attached to a front side of the heat sink 20, and a fan duct 40 secured to the fans 30. The CPU is mounted on a printed circuit board (not shown); a VRM (not shown) is also mounted on the printed circuit board near the CPU.

Figure 2:
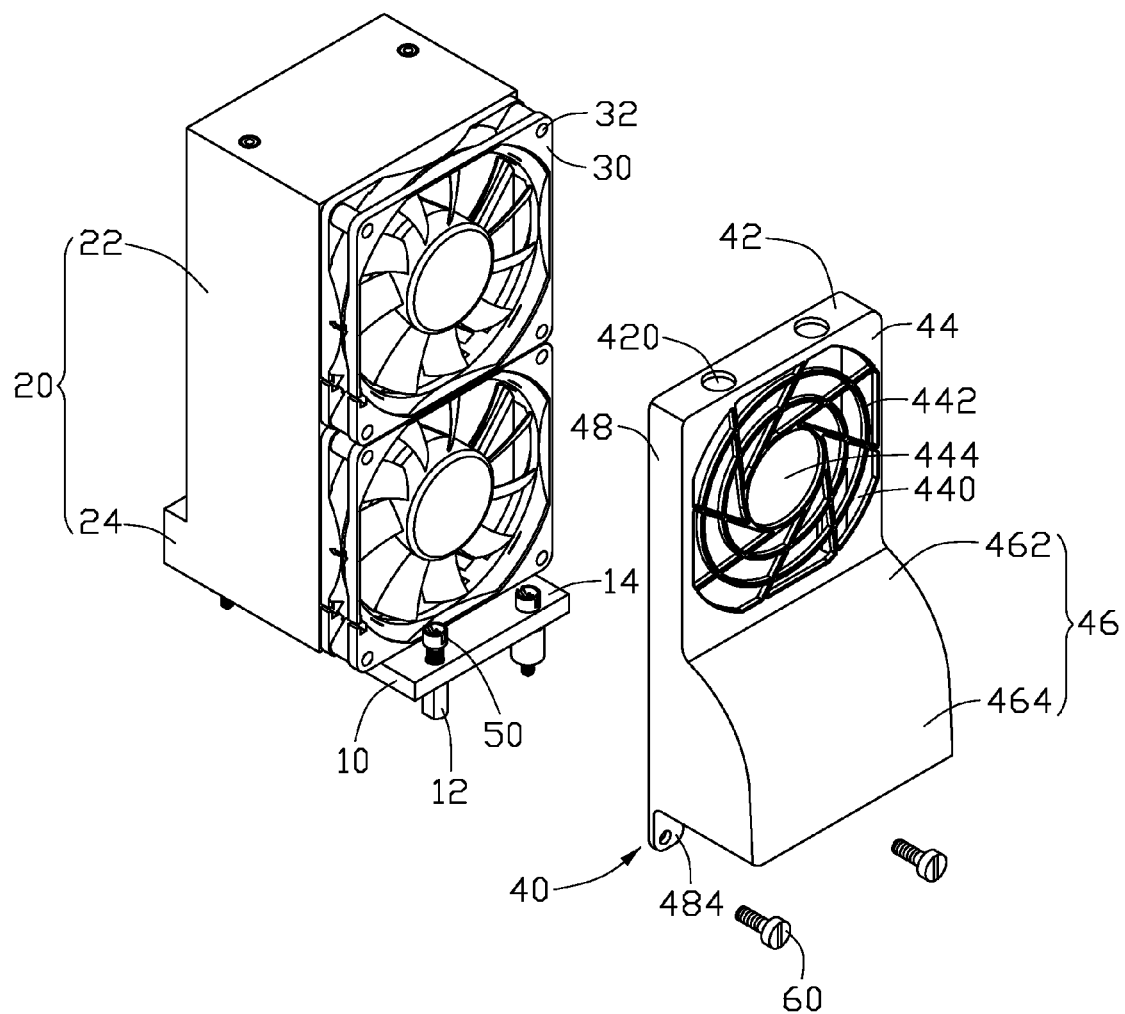
FIG. 2 is a partly exploded view of FIG. 1.

As shown in FIG. 2, the base 10 has a rectangular configuration with four locking feet 12 (only three being shown) extending downwardly and perpendicularly from a bottom face at four corners thereof, wherein the bottom face of the base 10 contacts the CPU for absorbing heat therefrom. Each locking foot 12 defines a through hole (not labeled) therein for providing a passage of a screw 50 therethrough. The screws 50 are used for extending through the printed circuit board and threadedly engage with a back plate (not shown) underneath the printed circuit board, thereby attaching the heat dissipating assembly to the printed circuit board.

The heat sink 20 comprises a cubic body 22 and a rectangular protrusion 24 projecting from a rear face at a bottom of the body 22. The body 22 and the protrusion 24 cooperatively define a rectangular bottom face of the heat sink 20 to contact and thermally connect with a top face of the base 10. The bottom face of the heat sink 20 has an area less than that of the base 10 to thereby form a border portion 14 of the base 10 outside reach of the heat sink 20. Eight threaded holes (not shown) are defined at a front face of the heat sink 20 and adjacent to a periphery of the heat sink 20. The eight threaded holes are used for mounting the two fans 30 to the heat sink 20.

The fans 30 are axial fans. Each fan 30 has a substantially square shape with four through holes 32 defined at four corners thereof, corresponding to four of the eight threaded holes of the heat sink 20. The fans 30 are attached to the front face of the heat sink 20 and approximate to each other in a manner such that one of the fans 30 is located at a lower position and the other one of the fans 30 is located at an upper position along a height direction of the heat sink 20. The fans 30 occupy almost a total area of the front face of the heat sink 20. Six screws (not shown) are brought to extend through upper six through holes 32 of the fans 30 to threadedly engage in corresponding threaded holes of the heat sink 20, thereby securing the fans 30 to the heat sink 20 firmly.

Figure 3:
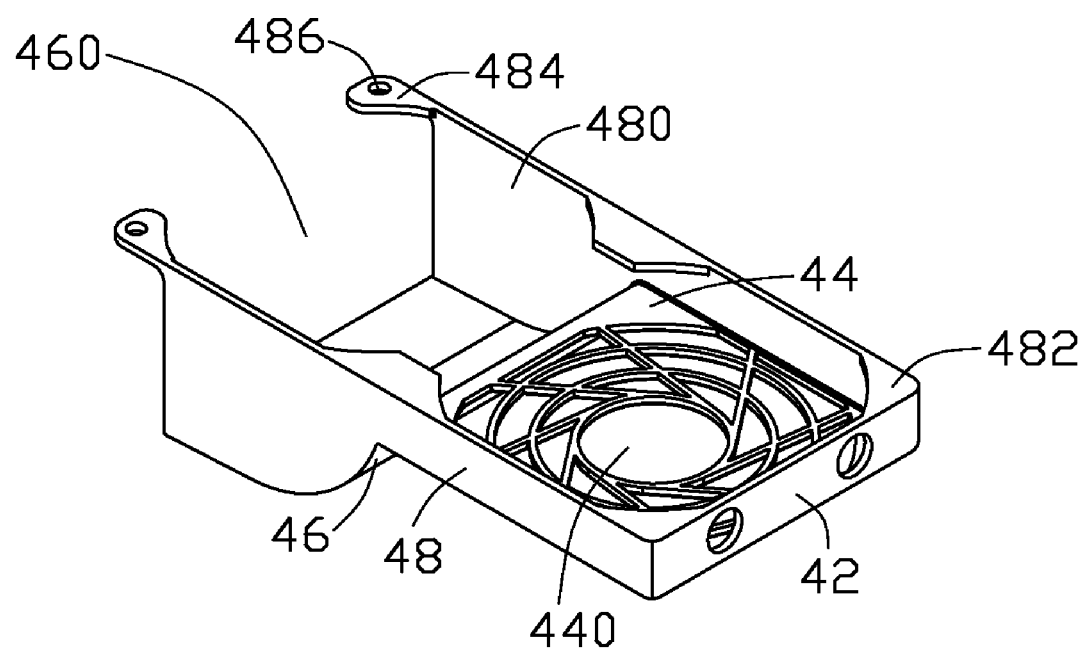
FIG. 3 is an isometric view of a fan duct of FIG. 1.
Figure 4:
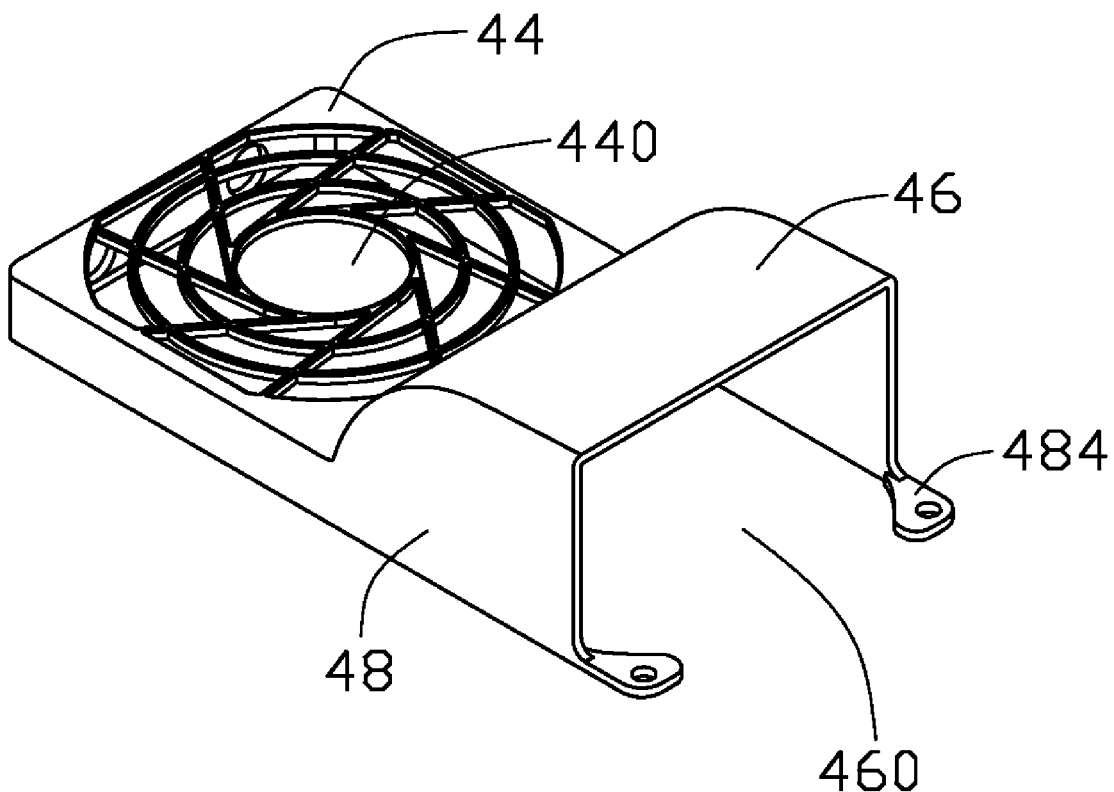
FIG. 4 is an inverted view of the fan duct of FIG. 3.

Also referring to FIGS. 3-4, the fan duct 40 comprises a rectangular top plate 42, a front plate 44, a baffle plate 46, and a pair of lateral plates 48. The top plate 42 is parallel to the base 10 and defines a pair of through holes 420 at two lateral sides thereof. The front plate 44 is formed perpendicularly and downwardly from a front side of the top plate 42 and parallel to the front face of the heat sink 20. A first inlet 440 is defined in the front plate 44 with a protective cage 442 covering the first inlet 440, thus preventing an operator from injury by carelessly touching blades of an impeller (not labeled) of the upper fan 30 when the fans are in operation. The protective cage 442 defines a central hole 444 in alignment with a hub of the impeller of the upper fan 30. The protective cage 442 comprises a plurality of annular strips (not labeled) concentrically surrounding the hole 444, and a plurality of elongated strips (not labeled) slantwise interconnecting the annular strips, wherein the elongated strips are arranged in volute respective to the hole 444. The first inlet 440 provides an entry of airflow into the fan duct 40. The baffle plate 46 extends downwardly and outwardly from a bottom side of the front plate 44, wherein the baffle plate 46 has an arced, downwardly gradually expanding portion 462 attached to the front plate 44, and a planar portion 464 parallel to the front plate 44 and connecting to a bottom edge of the arced portion 462 to define an outward, downwardly expanding port for the airflow. The lateral plates 48 couple the top plate 42 with the front plate 44 and the baffle plate 46. The lateral plates 48 and the top plate 42 cooperatively define a rectangular outlet 480 for the fan duct 40 in a rear side thereof. The outlet 480 has an area similar to that the fans 30 occupy. Bottoms of the lateral plates 48 and the baffle plate 46 cooperatively define a rectangular second inlet 460 for the fan duct 40. The lateral plates 48 are oriented perpendicular to the top plate 42 and the front plate 44, so that the second inlet 460 is parallel to the top plate 42 and the outlet 480 is parallel to the front plate 44. In other words, the second inlet 460 is oriented perpendicular to the outlet 480. Moreover, the first inlet 440 is oriented parallel to the outlet 480. The second inlet 460 communicates with the outlet 480 for providing a passage of the airflow. Four flanges 482 extend inwardly and vertically from inner sides of the lateral plates 48 and the top plate 42 at the rear side of the fan duct 40, wherein two flanges 482 are located at junctions of the top plate 42 and the lateral plates 48, and the other two flanges 482 are located at central portions of the lateral plates 48 respectively. A pair of engaging tabs 484 are formed inwardly and perpendicularly from the lateral plates 48 and at the rear side of the fan duct 40 adjacent to the second inlet 460 thereof. The engaging tabs 484 are coplanar with the flanges 482 and parallel to the front plate 44. A through hole 486 is defined in each engaging tab 484. The flanges 482 are glued to the fans 30 at positions corresponding to the upper six through holes 32 of the fans 30. The engaging tabs 484 are secured to the lower fan 30 by extending a pair of screws 60 through the through holes 486 of the fan duct 40 and lower two through holes 32 of the lower fan 30 to threadedly engage in corresponding threaded holes of the heat sink 20. Thus, the fan duct 40 is securely attached to the fans 30. The outlet 480 is adjacent to and oriented towards the fans 30; the first inlet 440 and the second inlet 460 are spaced from the fans 30 via the outlet 480 in a manner such that the first inlet 440 is located in a front of the upper fan 30, and the second inlet 460 is located below the lower fan 30 and above the base 10 and oriented toward the VRM on the printed circuit board.

In use, the heat generated by the CPU is conducted to the heat sink 20 via the base 10. As rotations of the impellers of the fans 30, a part of the airflow is drawn into the fan duct 40 via the first inlet 440 by the upper fan 30, and passes through the outlet 480 to blow an upper portion of the heat sink 20, thereby removing the heat from the heat sink 20. Another part of the airflow is driven into the fan duct 40 via the second inlet 460 by the lower fan 30. The another part of the airflow flows through the VRM on the printed circuit board to thereby cool the VRM. Moreover, the another part of airflow in the fan duct 40 is reflected by the baffle plate 46 of the fan duct 40 and drawn by the lower fan 30 into a lower portion of the heat sink 20. Thus, the heat in the heat sink 20 from the CPU is also taken away by the another part of the airflow. Therefore, the airflow generated by the fans 30 can cool not only the CPU, but also the VRM beside the CPU.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A heat dissipating assembly adapted for dissipating heat generated by a plurality of electronic components, the heat dissipating assembly comprising:
    a heat sink adapted for absorbing the heat from one of the electronic components;
    a fan being mounted on a front side of the heat sink; and
    a fan duct being secured to the fan for sandwiching the fan between the fan duct and the heat sink, the fan duct defining an outlet adjacent to the fan and an inlet, the outlet being oriented towards the fan and the inlet being oriented toward another one of the electronic components in a manner such that an airflow produced by the fan flows first through the another one of the electronic components thereby cooling the another one of the electronic components, then into the fan duct through the inlet thereof, and finally through the outlet to flow into and cool the heat sink.

2. The heat dissipating assembly as described in claim 1, wherein an additional inlet is defined in the fan duct above the inlet of the fan duct.

3. The heat dissipating assembly as described in claim 2 further comprising an additional fan mounted on the front side of the heat sink and above the fan.

4. The heat dissipating assembly as described in claim 2, wherein the fan duct comprises a top plate, a pair of lateral plates extending downwardly from two lateral sides of the top plate, and a cover connecting the top plate and the pair of lateral plates.

5. The heat dissipating assembly as described in claim 4, wherein the pair of lateral plates and the top plate cooperatively define the outlet of the fan duct.

6. The heat dissipating assembly as described in claim 5, wherein the cover comprises a front plate formed downwardly from a front side of the top plate.

7. The heat dissipating assembly as described in claim 6, wherein the additional inlet is defined in the front plate with a protective cage covering the additional inlet.

8. The heat dissipating assembly as described in claim 6, wherein the cover further comprises a baffle plate extending outwardly and downwardly from the front plate opposing to the top plate and connecting the pair of lateral plates to construct the fan duct.

9. The heat dissipating assembly as described in claim 8, wherein bottom sides of the baffle plate and the pair of lateral plates cooperatively to define the inlet of the fan duct, and the baffle plate has an arced face to define an outwardly, downwardly enlarging portion.

10. The heat dissipating assembly as described in claim 5, wherein the inlet of the fan duct is oriented perpendicular to the outlet and communicates with the outlet of the fan duct.

11. The heat dissipating assembly as described in claim 5, wherein a plurality of flanges and engaging tabs are formed from an inner side of the fan duct around the outlet, and the flanges and engaging tabs are used for attaching the fan duct to the fan and an additional fan.

12. A fan duct for guiding an airflow generated by fans to dissipate heat from a plurality of electronic components simultaneously, comprising:
    a top plate;
    a front plate extending downwardly from a front side of the top plate;
    a baffle plate formed downwardly and outwardly from a bottom side of the front plate, the baffle plate having an arced portion extending and expanding downwardly; and a pair of lateral plates extending downwardly from two lateral sides of the top plate and connecting the top plate, the front plate and the baffle plate, a first inlet is defined in the front plate for allowing a part of the airflow to flow into the fan duct and bottom sides of the baffle plate and the lateral plates cooperatively define a second inlet for allowing another part of the airflow to flow into the fan duct, the another part of the airflow being adapted for cooling heat generated by a first electronic component before the another part of the airflow enters the fan duct via the second inlet, and all the airflow being adapted for cooling heat generated by a second electronic component.

13. The fan duct as described in claim 12, wherein rear sides of the top plate and the lateral plates cooperatively define an outlet for the fan duct, the outlet being oriented perpendicular to the second inlet.

14. The fan duct as described in claim 13, wherein the first inlet and the outlet are oriented parallel to each other.

15. The fan duct as described in claim 12, wherein a protective cage is formed in the first inlet and comprises a plurality of annular strips and a plurality of elongated strips interconnecting the annular strips.

16. The fan duct as described in claim 15, wherein the protective cage defines a central hole therein with the annular strips concentrically around the central hole.

* * * * *